Dec. 26, 1933.  E. RICARD ET AL  1,940,699
PROCESS AND APPARATUS FOR CONCENTRATING ALCOHOL
Filed Aug. 14, 1930
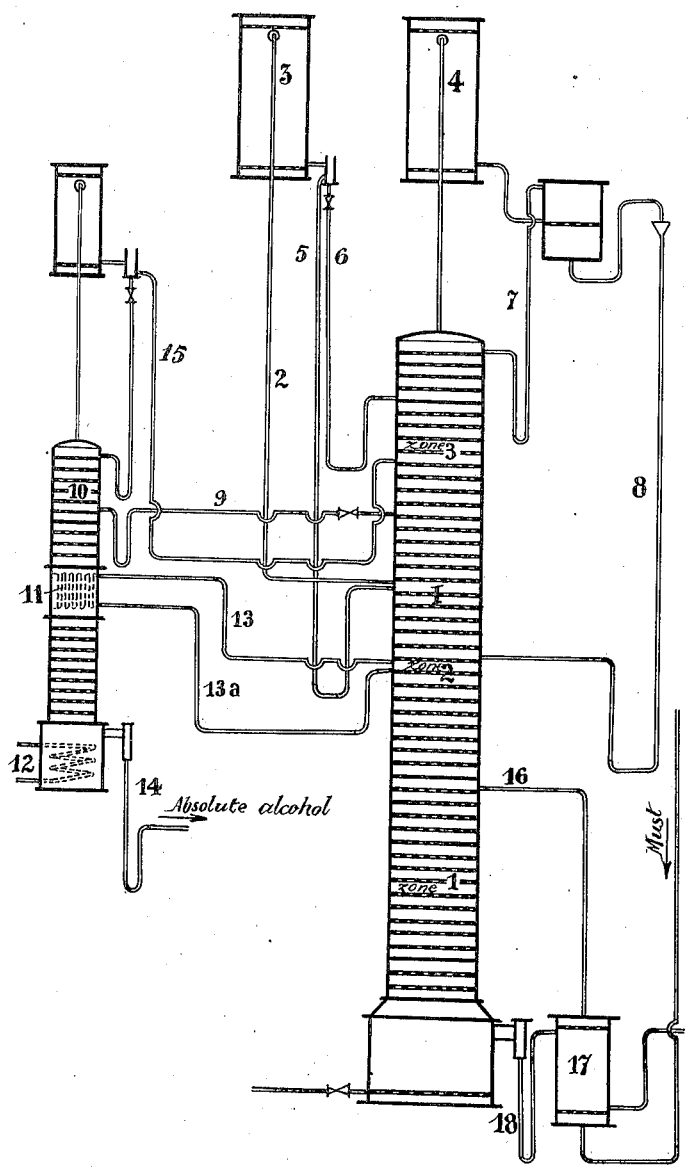
INVENTORS
Eloi Ricard and Henri Martin Gumiot
BY
J. F. Brandenburg
ATTORNEY Patented Dec. 26, 1933

1,940,699

UNITED STATES PATENT OFFICE 1,940,699

PROCESS AND APPARATUS FOR CONCENTRATING ALCOHOL

Eloi Ricard and Henri Martin Guinot, Melle, France, assignors to U. S. Industrial Alcohol Co., New York, N. Y., a corporation of West Virginia Application August 14, 1930, Serial No. 475,286, and in France August 26, 1929

11 Claims. (Cl. 202—42)

The processes of dehydrating alcohol in which the phenomenon of azeotropism is applied, have hitherto been applicable solely to concentrated alcohols. This fact can be understood because in these processes, in which the anhydrous alcohol is obtained as the tail product, one is obliged in order to remove the water which it contains to vaporize wholly at the same time a quantity of entraining liquid about 20 times as great. Thus it is an operation which, from the point of view of industry, becomes absurd as soon as the concentration of the alcohol to be dehydrated falls below a certain limit, for example 80–85° Gay-Lussac.

The process described in German specification No. 287897 in the name of Kubiersky, in which the dehydrating column is fed with vapours proceeding from the exhausting column, has failed for the same reasons.

If a dehydrating column is fed with vapours proceeding from an ordinary column for concentration to a high degree there is used only one 4th or one 5th of the heat actually expended in this column, the remainder being lost in the reflux condenser.

It is true that the present applicants in their Patent No. 1,822,454, dated Sept. 8, 1931 have described a process of dehydrating musts or dilute alcohol, but the process is rather one of recovering heat and consists in first concentrating the alcohol up to 90–95° Gay-Lussac in a first column, then dehydrating this alcohol by an azeotropic method in a second column having auxiliary small columns, this second column being heated by surface heating wholly or in part by the heat recovered from the first column.

The present invention has for object a process of dehydrating directly musts or dilute alcohol, which combines the method of ordinary distillation and the method of azeotropic distillation in the same distilling column with the aid of a common heating, utilizing only the steam necessary for exhausting the alcohol from the must, and thus producing an alcohol of a strength greater than 97.5°, which is then dehydrated completely by known means.

The accompanying drawing shows in diagrammatic form the apparatus used in carrying out the process of the invention.

To realize the invention there is used an ordinary column for high concentration, comprising, as is known, an exhausting zone (No. 1) and a concentrating zone (No. 2) for alcohol up to 90–95° G. L., and surmounted on this column a certain number of plates forming a third zone of azeotropic distillation, in which an entraining liquid added once for all operates indefinitely. This column being in operation, it is found that the liquid of some plates situated between the alcohol concentration zone (No. 2) and the upper zone (No. 3), where the entraining liquid operates, contains entraining liquid in quantity which decreases regularly in passing from above downwards and, particularly alcohol of strength higher than that of the azeotropic mixture, water-alcohol, 97.5–99.5 for example.

This degree depends, moreover, on the quantity of steam used at the lower part of the column, for the purpose of completely exhausting the must, and equally on the percentage of entraining liquid entrained on the plate.

On the other hand, at the top of the column are vapours of which the composition approaches that of the ternary mixture water-alcohol-entraining liquid. These vapours are condensed and then brought to the decanter. The lower layer, rich in water and alcohol, is returned continuously to a point of the main column where the alcoholic strength of the boiling liquid corresponds approximately with the strength of this lower layer. As to the upper layer in the decanter, this is wholly returned to the top of the main column.

The possibility of obtaining an alcohol of very high strength, that is to say a strength above that which is obtained by ordinary rectification in a suitable zone of the column, as has been indicated above, appears paradoxical, since water is separated not only at the lower part of the column (zone No. 1) but again at the top (zone No. 3). Without entering into complicated technical details, this phenomenon may be explained by the fact that where entraining liquid is found the water is more rapidly carried towards the top of the column than it is brought to this zone by the alcoholic vapour rising from the lower part.

However this may be, in order to arrive at a perfectly anhydrous alcohol, it suffices to withdraw boiling liquid from the plates carrying alcohol of very high strength, diluted in a quantity not too considerable with the entraining liquid (between the zones 2 and 3) and to pass it into a column having plates heated by surface heating, where it is freed by distillation from the small quantity of water and entraining liquid which it contains. As generally the exhaustion of the must in the zone No. 1 requires more steam than the rectification in zones 2 and 3, one can profitably heat the small column wholly or in part by removing aqueous alcohol vapour from the main column without cost for this heating.

When one is treating a must of low content of alcohol, requiring in consequence a large expenditure of steam for its exhaustion, it is advantageous to place a supplementary condenser about the level of the alcohol concentrating zone No. 2, which allows of reduced capacity of the main condenser, which operates under conditions less favourable, since the latent heat of the entraining liquid is low and the temperature at the top of the column sensibly below that of the alcohol. When a supplementary condenser is used the condensate may reenter the main column about the level of the zone No. 2, but it is equally to the point to introduce all or part of the condensate into the zone No. 3, where the entraining liquid is introduced; in this manner the operation of the main column is somewhat reinforced from the point of view of the degree of dehydration.

The process is applicable to the dehydration and purification of alcohol by means applied in ordinary rectification and by means described in United States applications, Serial No. 70,319½ of the 20th November 1925 in the name of the applicants, and Serial No. 112,644 of the 29th May 1926 in the name of the applicants.

In the case where very pure alcohol is required these two operations are not sufficiently efficacious for they do not allow of a complete elimination of the impurities which form with alcohol an azeotropic mixture. In this case there should be a preliminary purification of the must or dilute alcohol in an apparatus adapted to purify alcohol of low strength and to eliminate completely all impurities of this kind, and to allow the obtaining of an alcohol practically anhydrous, pure and organoleptically neutral.

The invention may be carried out wholly or in part under a pressure different from that of the atmosphere.

The following example illustrates the kind of apparatus and the process:—

Into a main column 1 there is introduced at 16 a must of 5° G. L. for example, which has been preheated as much as possible in 17 by means of the boiling residues which leave the column at 18. The column is heated by any means using the quantity of steam necessary for exhausting the must, it may be about 300 kilos per hectolitre of alcohol. The alcohol contained in the must is concentrated on the upper plates and the vapours cause to boil a mixture of benzene and special petroleum benzin introduced into the upper part of the column (zone No. 3). By means of the pipe 2 having a control cock, there is introduced into the condenser 3 a certain quantity of alcoholic vapour to relieve the condenser 4 which operates under the worst conditions, the temperature at the top of the column being 65° instead of 78°. The alcohol condensed in the condenser 3 is returned in part to the main column by the pipe 5 and in part by the pipe 6.

The vapors evolving from the top of still 1 have nearly the same composition as the ternary azeotropic mixture water-alcohol-auxiliary liquid. They are condensed in condenser 4 and thus yield a liquid which separates into two layers; the upper layer of which contains about 8% by volume alcohol, 0.7% water and 91.3% auxiliary liquid is returned through pipe 7 to the top of the still while the lower layer the mean composition of which is 58.6% by volume alcohol, 24% water and 17.4% auxiliary liquid is fed into the concentration zone through pipe 8.

Alcohol of high strength mixed with the entraining liquid is withdrawn by the pipe 9 from a plate where the temperature is of the order of 72–73° C. and is sent into a column 10 having surface heating, partly by the alcoholic vapour taken at 13 from the main column and introduced into the evaporator 11, and in part by live steam operating in the coil 12. The alcoholic vapour condensed in the evaporator 11 returns to the main column by the pipe 13a. From the lower part of the small column 10 there issues through pipe 14 anhydrous alcohol free from the entraining liquid, the latter being continuously refluxed into the main still, together with a little water and alcohol, through the pipe 15. Thus there is withdrawn from the apparatus only anhydrous alcohol at 14 and residue at 18 without any by-products.

The present invention is applicable to aqueous solutions of organic liquids which are dehydrated with difficulty, because they are very soluble in water and yield therewith a mixture having a minimum boiling point, for example isopropyl-alcohol, propyl-alcohol, glycol-chlorhydrin and the like.

For the purpose of explaining the invention it has been stated that there is a single main column. It is evident that there is nothing changed in the principle of the invention if this column is multiplied to several, provided that the interconnections of these columns ensure operation under the conditions analogous to that which occurs when a single plate column is used.

What we claim is:

1. A process for the manufacture of alcohol from aqueous solutions thereof, by continuous distillation and rectification in exhaustion and concentration zones, combined with distillation in presence of an entraining liquid in a third zone, in which process the vapors from the concentrating zone are introduced as a whole and directly into the lower part of the third zone and suffice for the heating of this zone, the reflux necessary for the concentration in the concentration zone is supplied by reflux from the third zone, and, at a region between these zones, alcohol of a concentration higher than that of the azeotropic mixture of water and alcohol is continuously withdrawn.

2. A process for the manufacture of alcohol from aqueous solutions thereof, by continuous distillation and rectification in exhaustion and concentration zones, combined with distillation in presence of an entraining liquid in a third zone, in which process the vapors from the concentration zone are introduced as a whole and directly into the lower part of the third zone and suffice for the heating of this zone, and in which the reflux necessary for the concentration in the concentration zone is supplied by reflux from the third zone, while at a region between these zones alcohol is obtained of a concentration higher than that of the azeotropic mixture of water and alcohol, and in which this alcohol is thence continuously withdrawn and is completely dehydrated and freed from last traces of entraining liquid by further treatment.

3. A process as set forth in claim 1, further characterized in that the operation is carried out at a pressure other than atmospheric pressure.

4. The process set forth in claim 1, further characterized in that the three zones are established within a single still, into which the aqueous solution is fed between the exhaustion zone and the concentration zone, and in which still, at a point below the third zone and above the concentration zone, the alcohol is brought up to a concentration higher than that of the azeotropic water-alcohol mixture.

5. The process set forth in claim 1, further characterized in that vapors taken from the top of the third zone are condensed, the condensate is decanted, the upper layer is sent back into the upper part of the third zone and the lower layer is returned to a lower zone.

6. The process set forth in claim 1, further characterized in that vapors taken from the top of the third zone are condensed, the condensate is decanted, the upper layer is sent back into the upper part of the third zone and the lower layer is returned to a lower zone, and further characterized in that vapors are withdrawn from the region in which highly concentrated alcohol is present and are condensed, and that this condensate is sent back into the third zone.

7. The process set forth in claim 1, further characterized in that vapors taken from the top of the third zone are condensed, the condensate is decanted, the upper layer is sent back into the upper part of the third zone and the lower layer is returned to a lower zone, and further characterized in that vapors are withdrawn from the region in which highly concentrated alcohol is present and are condensed, and that this condensate is sent back to the zone containing highly concentrated alcohol.

8. The process as set forth in claim 2, further characterized in that the region in which the further dehydration is performed is heated at least in part by alcoholic vapors taken from the process of concentration.

9. The process as set forth in claim 2, further characterized in that the region in which the further dehydration is performed is heated at least in part by indirect heat exchange from alcoholic vapors taken from the process of concentration and returned thereto.

10. A process for treating aqueous solutions of alcohols and their derivatives, the same being water-soluble organic liquids which form with water mixtures having a minimum boiling point, in order to obtain such liquids in very high concentration, said process involving continuous distillation and rectification in exhausting and concentrating zones, combined with distillation in presence of a water entraining liquid in a third zone, in which process the vapors from the concentration zone are introduced as a whole and directly into the lower part of the third zone, so as to suffice for the heating of this zone, and in which the reflux necessary for the concentration in the concentrating zone is supplied by reflux from the third zone, while at a region between these zones the organic liquid is obtained and withdrawn at a concentration higher than that of the azeotropic mixture which the liquid forms with water.

11. An apparatus for manufacturing absolute alcohol from dilute aqueous solutions, comprising the combination of a main column still which has an exhausting section, a rectifying section and above the latter a third section charged with entraining liquid, heating means at the base of this main column, the construction being such that the vapors leaving the rectifying zone pass as a whole directly into the lower part of the third zone, the heating of which they insure without any supplementary heating device, and that the reflux from the third zone supplies the reflux for the rectifying zone, an inlet for the feed solution to the column between the exhausting and rectifying zones, a take-off for alcohol of very high strength connected with the column between the second and third zones, and an auxiliary column still for dehydrating said alcohol and removing the last traces of entraining liquid therefrom, means for conducting the alcohol of very great strength to said auxiliary column, means for heating the auxiliary column at least partly with excess heat of the vapors in the main column, comprising a surface heating and condensing device in the auxiliary column, and means for conducting a portion of the heated alcoholic vapors from the main column to said device and for returning condensate therefrom to the main column.

ELOI RICARD.
HENRI MARTIN GUINOT.